United States Patent [19]

Ehrlich et al.

[11] E Re. 28,718

[45] Reissued Feb. 24, 1976

[54] TEXTILE MATERIAL AND MANUFACTURE

[75] Inventors: Engelbert Ehrlich, Floha, Saxonia; Martin Schönfuss, Hohenstein-Ernstthal, both of Germany

[73] Assignee: VEB Nahwirkmaschinenbau Malimo, Karl-Marx-Stadt Karl-Marx-Stadt, Germany

[22] Filed: Mar. 5, 1973

[21] Appl. No.: 337,780

Related U.S. Patent Documents

Reissue of:

[64] Patent No.: 3,611,754
Issued: Oct. 12, 1971
Appl. No.: 829,363
Filed: June 2, 1969

[52] U.S. Cl. ..... 66/192; 66/85 A
[51] Int. Cl.[2] ..... D04B 23/10
[58] Field of Search ..... 66/85 A, 192; 28/72.2, 28/77, 4 R

[56] References Cited

UNITED STATES PATENTS

| | | | |
|---|---|---|---|
| 2,377,564 | 6/1945 | Lundgren | 28/4 R |
| 3,010,178 | 11/1961 | Rust, Jr. | 28/4 R |
| 3,329,552 | 7/1967 | Hughes | 66/192 X |
| 3,365,918 | 1/1968 | Hughes | 66/85 A X |
| 3,395,065 | 7/1968 | Owen, Sr. | 66/192 X |
| 3,417,580 | 12/1968 | Scholtis et al. | 66/85 A UX |
| 3,452,561 | 7/1969 | Stousland et al. | 66/192 UX |

FOREIGN PATENTS OR APPLICATIONS

| | | | |
|---|---|---|---|
| 878,248 | 9/1961 | United Kingdom | 66/85 A |
| 1,143,827 | 2/1969 | United Kingdom | 66/85 A |
| 2,848 | 4/1963 | Japan | 66/192 |

*Primary Examiner*—Robert R. Mackey
*Attorney, Agent, or Firm*—Nolte and Nolte

[57] ABSTRACT

A run-resistant textile material includes a knitted structure of warp threads on a backing layer of loose fibrous material.

Individual fibers are pulled out of the layer by notched knitting needles of a warp knitting machine and formed into loops together with, and underlying the chain [switched] *stitched* warp threads. The fiber loops whose ends are anchored in the backing layer protect the fabric from laddering when a single stitch is broken.

4 Claims, 9 Drawing Figures

INVENTORS
ENGELBERT EHRLICH
MARTIN SCHÖNFUSS
BY Nolte & Nolte
ATTORNEYS

INVENTORS
ENGELBERT EHRLICH
MARTIN SCHÖNFUSS
BY Nolte & Nolte
ATTORNEYS

TEXTILE MATERIAL AND MANUFACTURE

Matter enclosed in heavy brackets [ ] appears in the original patent but forms no part of this reissue specification; matter printed in italics indicates the additions made by reissue.

The present invention relates to a textile material and to a method of producing same by using a warp knitting machine [ and, more particularly, a sewing operation-simulating warp knitting machine] . The textile material comprises a ground [cloth] or backing layer of loose fibrous material enmeshed in the loops of chain-stitched warp threads and is produced in a warp knitting machine having sharp-pointed hooked needles which are engageable by slides.

BACKGROUND OF THE INVENTION

Textile materials in which a backing of fibrous material is combined with a warp-knitted superposed structure are well known. In one type of material the loose fibers which form the body of the backing are traversed by the loop chains of a fringe-stitched yarn system. In another type of material the warp threads are tied in with the fiber backing by tricot stitches or by another yarn system available for the production of warp-knitted webs.

It is a common disadvantage of these and similar textile materials that they are not run-resistant: that is, they develop more or less readily visible "ladders" when a single stitch is broken. Such "ladders" which extend in the lengthwise direction of the material are particularly conspicuous when the structure is made of silk threads.

One attempt to lessen or to eliminate the development of "ladders" in textile materials involves the application of chemical bonding agents which is very expensive. Another attempt which also requires considerable additional expenditure, seeks to combine several yarn systems in the warp knitting process, but this method does not always succeed in making the material run-resistant. Yet another approach is to embed the loose fibers in the loops of the chain stitched warp threads without interlacing them therewith. For this purpose the needle shanks are provided with hook-like grooves in which the loose fibers are caught. As the needles are moved back, the fibers are dragged along and subsequently [knitting] *knitted* stitches are formed on top of the fibers. However, this process very rarely provides an adequate deposition of fibers in the loops of warp threads: as the fabricated material is transferred, the perforations made by the needles in the fibrous backing layer during the stitching operation becomes enlarged, so that the surrounding loose fibers are pushed aside. During the subsequent needle passes there will be only a very few fibers in the operating range of the grooved needles. Moreover, the face of a material wherein loose fibers are inserted in the loops of warp threads, without being interlaced therewith, has in general an uneven appearance and even resembles, in places, a pile fabric such as plush, which is undesirable for a number of purposes. Also, the work that has to be done by the grooved needles in pulling fibers out of the backing and dragging them along, is apt to add substantially to the total of the forces normally acting upon the needles. Since grooved needles are not very strong they tend to break under the stresses. Even if an effort were made to supply the grooved needles with a constant quantity of loose fibers, this would not lead to a satisfactory solution of the problems, since neither the appearance of the material nor the functioning of the machine equipped with conventional type needles would be improved.

SUMMARY OF THE INVENTION

It is, therefore, an object of the present invention to provide an improved textile material and a method of, and machinery for, making the same, which obviates the drawbacks of the prior art.

Another object is to provide a run-resistant textile material which can be produced economically.

A further object is to provide an improved run-resistant textile material by using a warp knitting machine [ , particularly a sewing operation-simulating warp knitting machine, ] and only one yarn system.

Yet another object is to provide an improved run-resistant textile material of wide usefulness and of pleasing appearance and feel, which is devoid of protruding fiber tufts.

These objects and others which will become apparent hereinafter are attained, in accordance with the present invention, by providing under the loops of the chain stitched warp threads on the face of the fabric additional loops or loop-like structures formed from fibers, which are incorporated within the meshwork of the chain-stitched warp threads for the purpose of arresting the development of "ladders" in the material.

Although loops or loop-like structures made from the fibers of a fibrous loose material have been produced in the prior art, the interlinking of such loops with the loops of chain-stitched warp threads, and the resulting run-resistance of the fabricated textile material are novel features of the present invention.

To produce the material, the fibrous matter in bulky and expanded form is fed into the knitting location, so that it is traversed by the needles on their forward pass. Once the needles have entered the fibrous material the latter is rapidly and strongly compressed. During the backward pass of the needles, after insertion of the yarn into the hooks, a sufficient amount of fibers are pulled away from the fiber bulk to be formed, together with the warp threads, into loops or loop-like structures.

The warp knitting machinery used in the process may be, for example a [sewing operation-simulating] warp knitting machine which has under the hooked needles, and between the knocking-over cam and the counter bar, a detent for the fibrous material, whose installation defines an area for holding such material.

BRIEF DESCRIPTION OF THE [DRAWING] *DRAWINGS*

The above and other objects, features and advantages of the present invention will become more readily apparent from the following description, reference being made to the accompanying [drawing] *drawings* in which.

DESCRIPTION OF THE PREFERRED EMBODIMENTS

Figure 1:
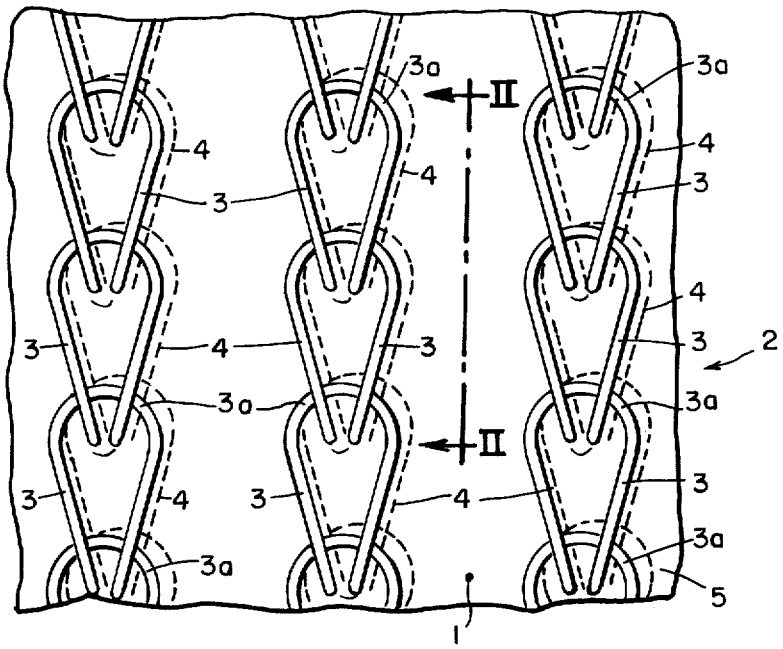
FIG. 1 is a somewhat diagrammatic detail view of the face of a textile material according to the invention.

Referring particularly to FIG. 1, there is shown the face 1 of a textile material 2 comprising a backing 5 and superposed structure thereon including loops 3 and 4. The backing is comprised of a fibrous layer of loose filling threads, a wadding or a fleece. The loops 3 are formed from chain-stitched warp threads and are arrayed in closely-spaced parallel rows extending longitudinally through the material. Each loop 3 is interlaced with a head or closure 3a which traverses the backing layer 5 in a direction normal to the face thereof and secures loop 3 to the underlying fibrous material. A loop, or a loop-like structure 4, made from fibers which have been drawn out of the loose fibrous layer 5, and referred to hereinafter as a fiber loop, has substantially the same shape as loop 3 and is disposed below each loop 3, between the latter and the adjacent face 1 of the fibrous layer 5. The fiber loops 4 are pulled through, and secured by, the heads 3a of the loops 3; but unlike the latter which are formed of the chain-stitched warp threads enmeshing the layer 5, the fiber loops 4 are not interknit therewith. As can be seen from FIG. 2, the fiber loops 4 are substantially open loops whose elongated end pieces 4a extend into the fibrous layer 5 and in general terminate at the opposite face 5a thereof, remote from the superposed array of loops 3. Because the loops 4 are formed entirely of fibers pulled out of the layer 5 they do not need a connecting structure comparable to the sinkers 3b of the warp thread loops 3.

Figure 2:
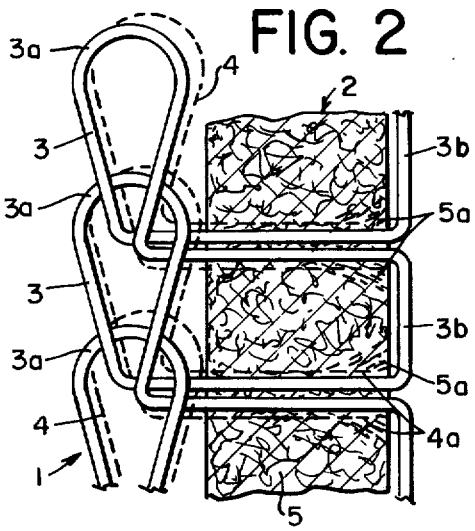
FIG. 2 is a cross-sectional view, taken along the line II—II of FIG. 1.

The yarn system shown in FIG. 2 is a fringe stitch; but it is to be understood that a tricot stitch or any other yarn system compatible with warp knitting may be applied, without affecting the structure of face 1 of the material 2 in any significant way.

Figure 3:
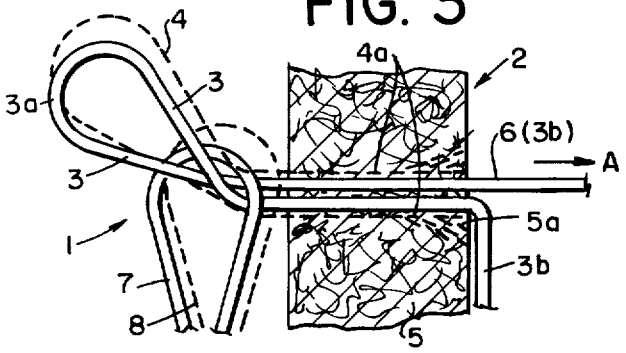
FIGS. 3–8 are cross-sectional views corresponding to the view of FIG. 2, illustrating the obstruction developing against a run in a textile material according to the invention.
Figure 4:
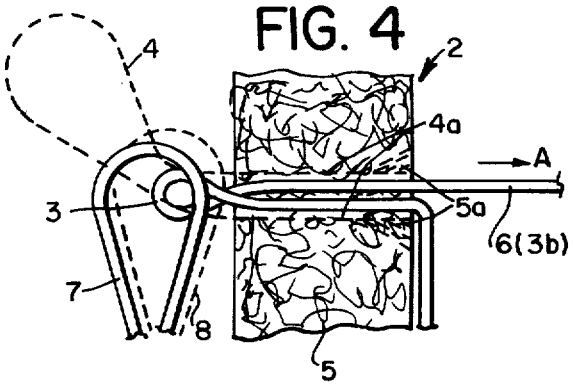
Figure 5:
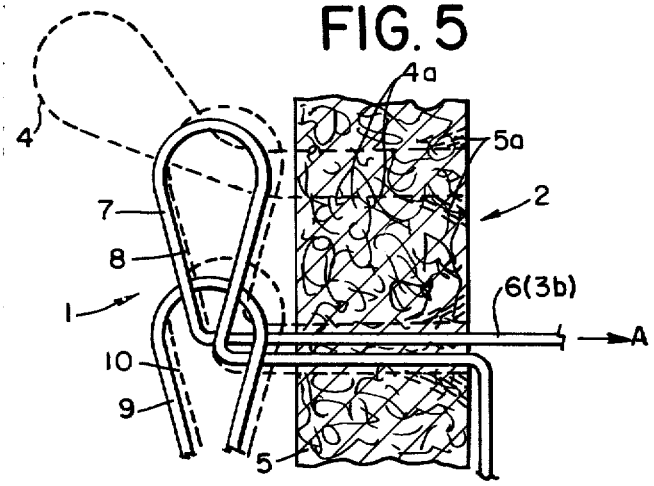
Figure 6:
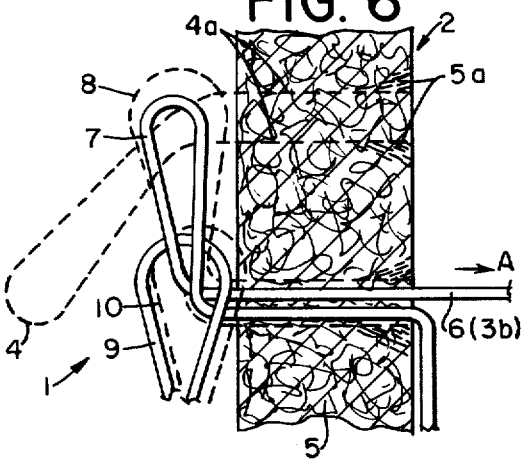
Figure 7:
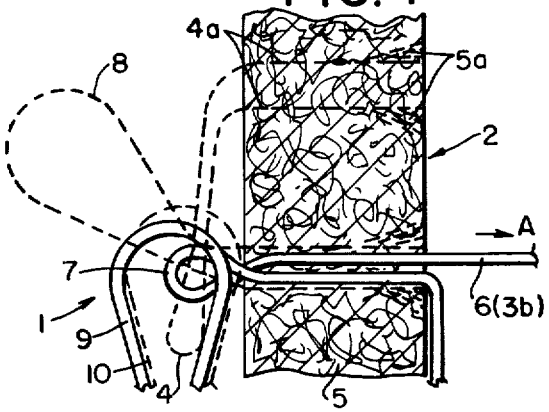

It is well known that a fringe stitch can be separated very easily from the backing layer just by pulling on the threads disposed on the sinker side, provided, of course, that there has been a yarn break. By themselves the other yarn systems of warp knitting also have an inadequate run-resistance. For example, a tricot stitch may also be unravelled by a tug on the yarn disposed on the sinker side of the fabric. If the thread 6, corresponding to the sinker stitch 3b in the illustration of FIG. 3 is pulled in the direction of the arrow A, the interlacing of loop 3 with the following chain stitched warp thread loop 7 and with the fiber loop 8 will begin to be undone and will disintegrate entirely if the pulling continues (cf. FIGS. 4 and 5). The fiber loop 4 will be retained in the warp thread loop 7 and in the fiber loop 8. In the following stage (FIG. 6), the warp thread loop 3 has disappeared, and warp thread loop 7, which is next in line, is on the way of being disintegrated. Fiber loop 4 which originally had been overlaid by warp thread loop 3 is now exposed; the pull exerted on warp thread loop 7, with with which fiber loop 4 is connected, tends to elongate the latter and to divert it through an angle of approximately 180 degrees, until it lies close against the face 1 of the material 2 (FIG. 7) in a direction opposite to its original attitude. The closed end of the loop 4, in the new position, is in the location formerly occupied by the open end thereof.

Figure 8:
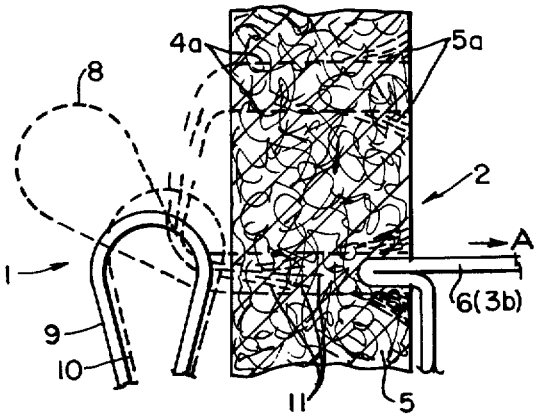

In the new position the fiber loop 4 effectively obstructs the detachment of further warp thread loops when a pull is exerted on the yarn end 6. If the pull is relatively weak a run may be stopped entirely at the stage shown in FIG. 7. At a more vigorous pull the deformed fiber loop 4, together with the remaining part of the warp thread loop 7, will be drawn through the successive warp thread loop 9 which is superposed on another fiber loop 10 (FIG. 8).

Additional fiber loops will be pulled away in the course of the process if they happen to be in the zone of the run. In that case the warp thread loop 9 will be the next arresting means against further disintegration. Subsequently the entire process may be repeated in substantially the same sequence, beginning with the stage illustrated in FIG. 3. Loops 9 and 10 will then carry along a fiber tuft 11 which is a remnant of fiber loops removed earlier during the process. The fiber tuft 11 tends to retard or to prevent altogether the disintegration of loop 9.

There is thus a snowballing effect as the number of disintegrated warp thread loops increases. In short order the forces opposing runs will grow faster than the forces producing runs, and a complete arrest of the incipient "ladder" is soon achieved. In practice it has been shown that under normal conditions at most six warp thread loops will disappear from the material according to the invention, after a run has been started.

In view of the run-resistant properties of such material only one thread chain enmeshing the fibrous layer 5 is required, and an additional second or third thread chain, to be tied into the layer in combination with the first in order to prevent runs, can be dispensed with.

Besides being run-resistant, the material according to the invention, has a smooth appearance and a pleasing feel. There are no undesirable plush characteristics.

Figure 9:
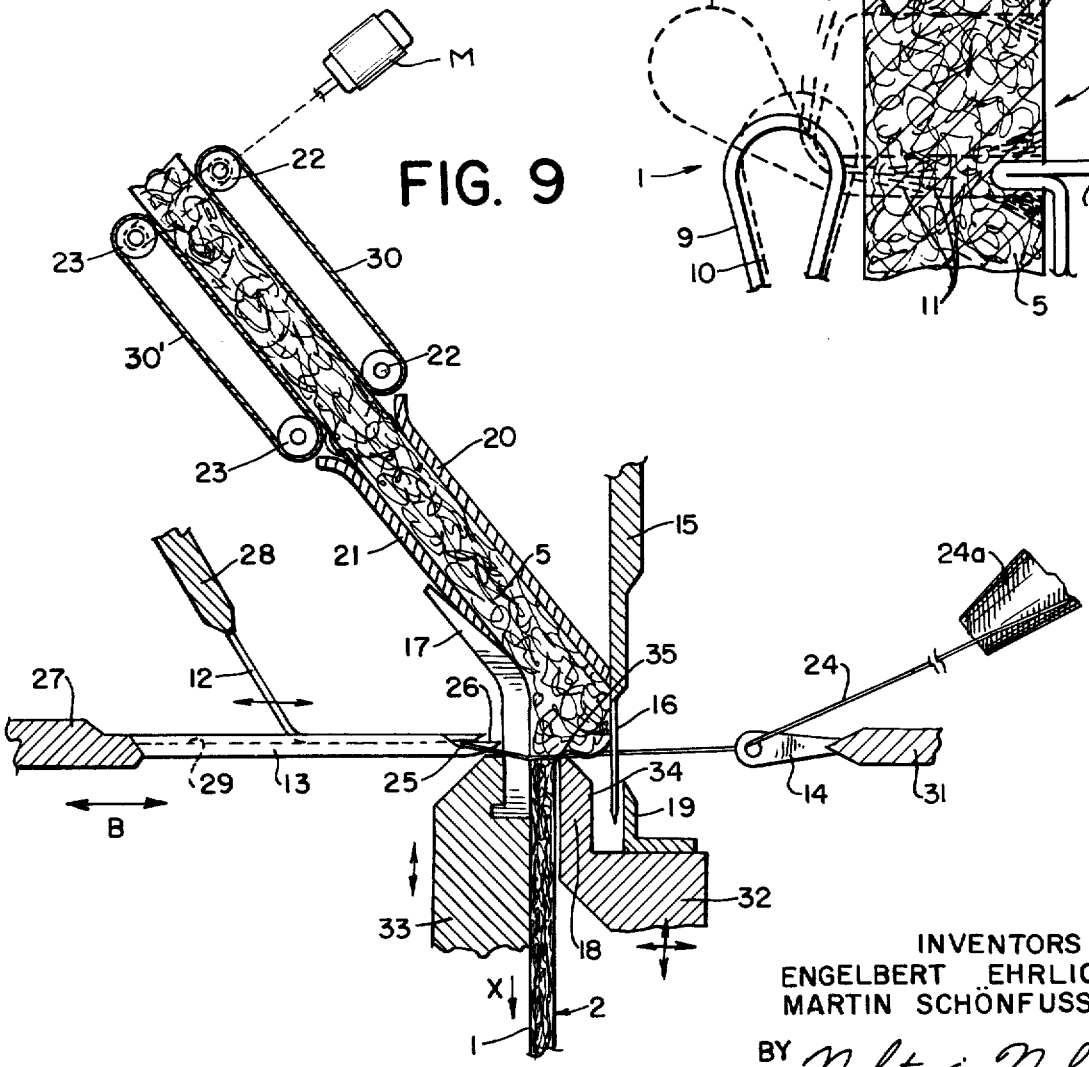
FIG. 9 is a fragmentary sectional view of a modified [sewing operation simulating] warp knitting machine.

Referring now to FIG. 9, there is shown therein a part of a machine adapted to produce the textile material illustrated in FIGS. 1 and 2. While the material may be made in any apparatus used by those skilled in the art to prepare textile materials out of natural or man-made fibers one preferred embodiment of the invention provides for a [sewing operation-simulating] warp knitting machine. The machine is equipped with a plurality of knitting needles 13 (of which only one is shown), each of which has a hook 25, similar to the hook of a crochet needle on its shank and, at the front end a sharp point 26, similar to the sharp end of a sewing needle. The point 26 is not within the longitudinal center axis of the needle 13 but is off center in the plane of the hook 25 toward the open side of the hook. The needle 13 is attached to a shaft 27 which is connected to a needle bar (not shown), whereby the needle is operatively connected to reciprocating means for movement in the direction of the arrow B.

A wire or strip slide 12, fastened to a holder 28, is connected to reciprocating means (not shown) and adapted to close the hook 25 of the needle 13 so as to retain knitting thread 24 in the bight of the hook. The slide 12 is movable in a groove 29 provided in the shank of the needle 13.

The operation of the knitting needle 13 is synchronized with that of an eye needle 14 to which the knitting thread 24 is fed from a spool 24a or another suitable feeding device. The eye needle 14, attached to a holder 31, is rotatable about the axis of the needle 13 at a predetermined rate of revolution, whereby the knitting thread 24 is introduced into the hook 25 of the needle 13.

Fibrous material 5, comprising a voluminous and bulky mass of randomly oriented and loosely packed natural or man-made fibers is brought into the operating zone of the needles 13, 14 between conveyor belts 30 [31] *30'* running on pairs of rolls 22, 23. Guide sheets 20 and 21 bordering the sides of belts 30, 30' retain the fibrous material thereon. The conveyor belts 30, 30' define with the guide members 20, 21 a passage inclined at an angle of approximately 45 degrees relative to the operating plane of the needles 13, 14. The conveyor belts 30 and 30' are operatively connected to a motor M. In the operating zone the fibrous material 5 is supported laterally by, respectively a knock- [off] *over* cam 17 proximate to the needle 13, and a counter bar 15 proximate to the needle 14. The knock- [off] *over* cam 17 and the counter bar 15 are aligned substantially parallel to each other and extend perpendicularly to the longitudinal axis of the needles 13, 14. At its upper end the knock- [off] *over* cam 17 is bent and forms a support for the guide member 21 on which the major portion of the weight of the fibrous material 5 rests.

The cam 17 is attached to a base 33. The counter bar 15 is provided with a plurality of pins 16 which point downward and which are placed so that the knitting thread 24, guided through the eye of the needle 14, passes between them.

A detent or stemming device 18, positioned under the operating plane of the needles 13, 14, within the area defined by cam 17 and the pins 16, is adapted to restrict the passage area of the fibrous material 5 in the region of the needles. The stemming device 18 is attached to a base 32 and forms an arm which is shiftable (by means not shown) in a lateral direction between the knock- [off] *over* cam 17 and the counter bar 15 and pins 16, as well as vertically at a right angle to the lateral shift. The face 34 of the stemming device 18, which is remote from the fibrous material 5, has a slanted portion at its upper end which terminates in point 35 at the tip of the opposite face of the stopping device.

A rapid compression of the fibrous material 5 induced by a predetermined constriction of the passage subsequent the operating zone of the needles, causes the fibrous material to be confined in an area of substantially step-shaped cross-section. An abutment 19 mounted on the base 32 is designed to support the pins 16 against lateral deflections which tend to arise from the push of the needle 13 piercing the fibrous material in the direction of the needle 14.

According to the present invention the fibrous material 5 arrives at the operating zone of the needles 13, 14, at a moderate speed, induced partly by the forward motion of the conveyor belts 30, 30' and partly by gravity acting on the weight of the material moving on an inclined surface. In addition, the pull of the finished textile material 2, as it is removed from the machine in the direction of the arrow X, causes the strongly cohering fibrous material 5 to settle in the operating range of the needles 13, 14, at undiminished bulk and volume. Within the operating zone the material 5 is pierced by the needles 13 which, at their forward position, receive in the bight of their hooks 25 the knitting thread 24 guided through the eyes of the needles 14. In the area defined by the suitably adjusted stemming device 18, the counter bar 15 and the knock- [off] *over* cam 17 the fibrous material is compressed, so that a large quantity of closely packed fibers are presented to the needles on their return movement out of the fibrous material. Fibers caught in the bight of the hooks 25 during the retraction of the needles 13, are carried back together with the warp thread 24, and are secured by slides 12 which engage the needle hooks before the needles are withdrawn from the material 5. Subsequently the fibers and the thread 24 are formed simultaneously into loops, the fiber loops 4 underlying the warp thread loops 3, as shown in FIGS. 1 and 2. Depending on the coordination of the needles 13 and 14, different yarn systems may be produced, i.e. fringe stitches, tricot stitches and the like.

The introduction of the fibrous material 5 in a voluminous bulky condition into the region of the needles 13, 14, the large expanse occupied by the fibrous material in the operating zone, and its subsequent sharp compression assure the presence of a fiber loop 4 under each warp thread loop 3. If the prerequisite conditions do not exist, and if the fibrous material used as a weight of less than 400 g./m.$^2$, the largest portion of the warp thread loops 3 will lack underlying fiber loops 4. Since an interruption in the array of fiber loops increases the tendency toward "laddering," runs can be arrested in such textile materials only in isolated spots. By contrast, a [ sewing operation-simulating ] warp knitting machine, having a structure according to the invention, is well suited to produce run-resistant textile material of all usable weight categories, and particularly of lightweight material for outerwear.

What is claimed is:

1. A textile material comprising a base, said base including a plurality of loose fibers, a warp knitted yarn system constituted of parallel rows of interlocking loops piercing said base and forming stitches on the opposite side thereof to secure said yarn system on said base, and a plurality of discrete fiber loops intermediate said base and said yarn system, each of said fiber loops being formed of at least one of said loose fibers and having ends which are located within the base and a closed loop portion closely underlying and following the configuration of a respective loop of the warp knitted yarn system, each of the fiber loops thereby being paired with a respective loop of the warp knitted yarn system, each of the pairs of loops passing through a next adjacent one of the pair of loops in the same row.

2. A method of producing a textile material on a warp knitting machine comprising feeding a relatively voluminous web of loose fibers in a relatively uncompressed condition into the operating range of the reciprocating needles of the warp knitting machine, advancing the knitting needles into and through said web for perforation of the web and for positioning of the hooks at the far side of the web, inserting warp yarns into the hooks of said knitting needles at the far side of the web, retracting said knitting needles into the web thereby to insert loose fibers into the hooks of the knitting needles, closing said hooks of said needles after said insertion of loose fibers but prior to withdrawal of the needles from said mass, forming the inserted warp yarns together with the inserted fibers into warp knit stitches on the near side of the web, and immediately proximate the operating range of the needles on the far side of the needles in the direction of travel of the web compressing the web into a cross section in the direction of reciprocation of the needles pronouncedly smaller than the cross section of the web in said direction as it is fed to the operating zone.

3. A method as defined in claim 2 wherein said fibers are formed into loop-like structures.

[4. A warp knitting machine, comprising warp knitting means including a row of reciprocable knitting needles having hooks, the paths of reciprocation of the hooks defining a knitting zone, a row of yarn guides parallel to the row of knitting needles, means for supplying a respective yarn to each of the yarn guides, said yarn guides being adapted to insert the yarn into the hooks of the knitting needles for the forming by the knitting needles of the yarn into chains of warp knit stitches, knock-over means proximate to said needles for knocking over the stitches formed by the needles, counter means substantially parallel to the knock-over means, the knock-over means and the counter means being positioned along the knitting zone traversely of the paths of reciprocation of the needles, means for conducting a base to and passing the base through the knitting zone between the knock-over means and the counter means, and means for compressing the base in the direction of reciprocation of the needles immediately after the knitting zone.]

[5. A warp knitting machine as defined in claim 4 in which said counter means includes a bar and a plurality of pins extending downwardly from said bar, the pins being so spaced relative to each other as to permit the yarns to be guided and the needles to reciprocate between adjacent ones of the pins.]

[6. A warp knitting machine as defined in claim 5 including an abutment mounted adjacent to said pins on the side thereof remote from the knock-over means to limit or prevent deflection of the pins in the direction of forward movement of the needles during forward movement of said needles through the base.]

[7. A warp knitting machine as defined in claim 4 wherein said conducting means comprises a endless conveyor belt angularly disposed relative to the direction of said needles and a pair of guide members positioned for receiving the base from the belt and delivering the base to the operating zone between the knock-over means and the counter bar.]

8. A warp knitting machine as defined in claim 4 [ in which ] *including means for displacing* the compressing means [ is displaceable ] laterally intermediate said knock-over means and said counter means and vertically toward and away from said knitting needles.

* * * * *